Dec. 16, 1930.     G. D. MALLORY     1,785,683
BRAIDING MACHINE
Filed May 15, 1929     2 Sheets-Sheet 1
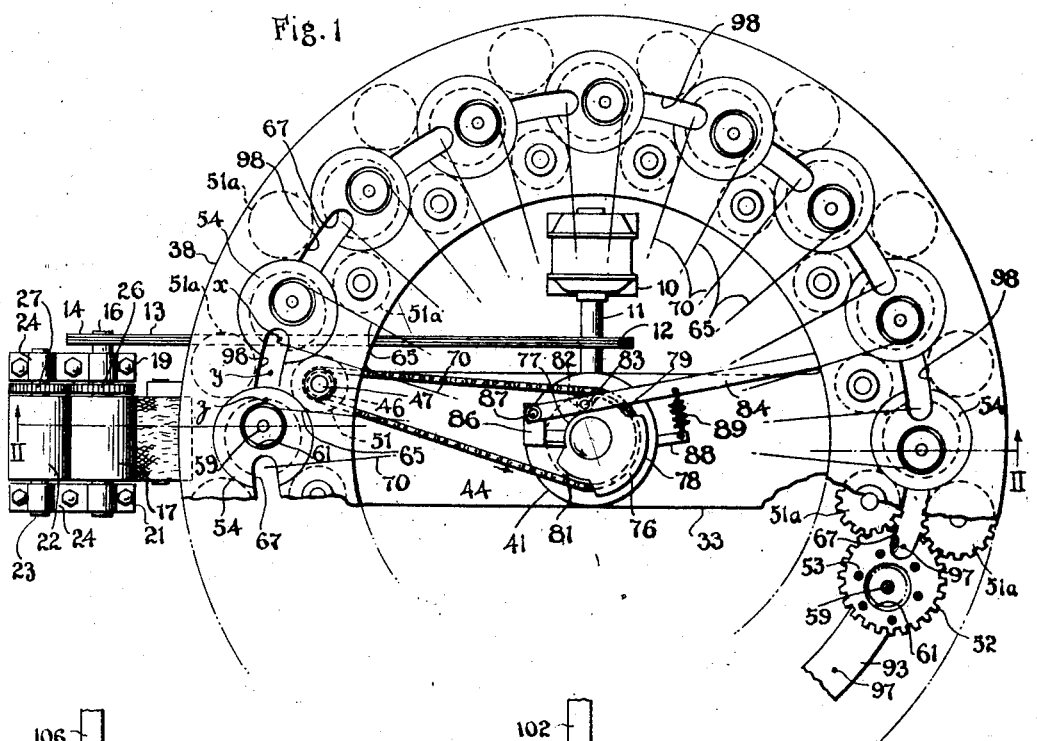

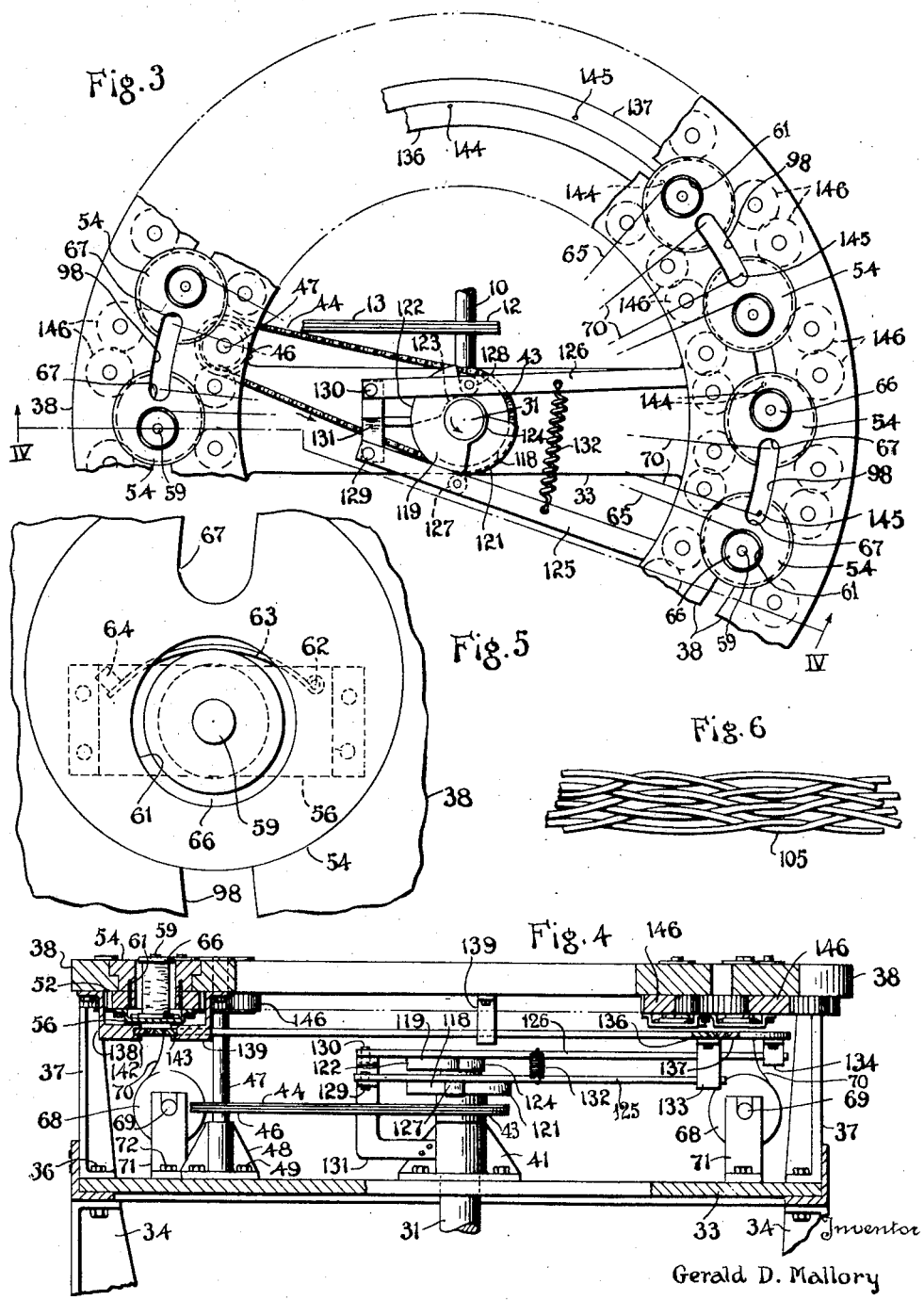

Patented Dec. 16, 1930

1,785,683

UNITED STATES PATENT OFFICE

GERALD D. MALLORY, OF AKRON, OHIO, ASSIGNOR TO THE GOODYEAR TIRE & RUBBER COMPANY, OF AKRON, OHIO, A CORPORATION OF OHIO

BRAIDING MACHINE

Application filed May 15, 1929. Serial No. 363,369.

This invention relates to braiding machines generally and has particular relation to apparatus of the above designated character which shall be especially applicable for braiding bead tape employed in the beads of pneumatic tire casings.

One object of the invention is to provide a braiding machine in which a plurality of spools upon which wire or other material is spirally wound will be located in a stationary position upon the machine relative to a plurality of other spools also supporting such wire or material.

Another object of the invention is to provide a machine for braiding wires or other tension resisting elements at a more rapid rate than the machines heretofore employed for this purpose.

Another object of the invention is to provide a braiding machine embodying a greatly reduced number of moving parts as compared to the machines heretofore employed, thus proportionately reducing the depreciation in such machines from breakage, wear, etc.

Prior to the invention, in machines of this character, all of the spools of wire generally have been movably mounted relative to each other and consequently, it has been impossible to operate such machines at high rates of speed without producing an imperfect article of manufacture or without an excessive amount of breakage and wear of the parts of the machine.

For a better understanding of the invention, reference may now be had to the accompanying drawings, forming a part of the specification, in which:

Figure 1 illustrates a fragmentary plan view of one form of apparatus embodying the principles of the invention;

Figure 2 is a cross-sectional view of the apparatus illustrated by Figure 1, taken substantially along the line II—II thereof;

Figure 3 is a fragmentary plan view of another form which the invention may assume;

Figure 4 is a cross-sectional view of the apparatus illustrated by Figure 3, taken substantially along the line IV—IV thereof;

Figure 5 is a view illustrating a brake mechanism employed to oppose the rotative movement of the spools embodied in the machines illustrated by Figures 1 and 4; and Figure 6 is a view of a section of wire tape braided by the apparatus embodying the invention.

Referring to Figures 1 and 2, a motor 10, rigidly secured to the floor of a building, is provided with a drive shaft 11 projecting therefrom, upon an intermediate portion of which a sprocket wheel 12 is secured. A chain 13, driven by the sprocket wheel 12, in turn drives a sprocket wheel 14, which is rigidly mounted upon a shaft 16 having a roller 17 rigidly secured on an intermediate portion thereof beyond the sprocket wheel. Journal bearings 19 and 21 rotatably support the shaft 16 adjacent its opposite ends. A roller 22 disposed closely adjacent the roller 17, likewise is rigidly secured on an intermediate portion of a shaft 23 which, like the shaft 16, is rotatably mounted adjacent its opposite ends in a pair of journal bearings 24. The rollers 17 and 22 are positively driven in opposite directions by a pair of intermediate spur gears 26 and 27 which are rigidly secured on the shafts 16 and 23, respectively.

A bevel gear 28, rigidly secured on the end of the shaft 11 beyond the sprocket wheel 12, meshes with a bevel gear 29 which is rigidly mounted upon an intermediate portion of a vertically disposed shaft 31 having its lower end rotatably supported by a thrust bearing 32. The upper end of the shaft 31 projects through a centrally disposed opening formed in a large circular frame plate 33, which is supported at its outer edges by spaced pedestals 34. Bolts 36, employed for securing the frame plate 33 rigidly upon the pedestals 34, likewise secure a plurality of pedestals 37 upon the upper surface of the plate 33, directly above the pedestals 34. On the upper ends of the pedestals 37, a large guide ring 38, divided into two concentric annuli or rails, is secured by bolts 39. The upper end of the shaft 31 is rotatably supported by a bearing 41, which is secured to the upper surface of the plate by bolts 42. A sprocket wheel 43 secured on the end of the shaft 31 beyond the bearing 41 drives a chain 44 which in turn drives a sprocket wheel 46 rigidly mounted on an intermediate portion of a vertically disposed shaft 47.

A three-to-one driving ratio between the shafts 47 and 31 respectively is maintained by a similar inverse ratio between the size of the gears 46 and 43. The lower end of the shaft 47 is rotatably mounted in a thrust bearing 48 secured rigidly to the plate 33 by bolts 49, while the upper end thereof is journaled in an opening formed in the cooperating rails of the guide ring 38. A gear 51, rigidly secured on the upper end of the shaft 47 adjacent the guide ring 38, meshes with an adjacent pair of a plurality of gears 52, which are secured by bolts 53 to the lower surfaces of an equal number of flanged discs 54. The discs 54 and the gears 52 thus secured rigidly together are rotatably mounted in uniformly spaced openings formed intermediate the edges of the guide ring 38 throughout the extent thereof. Brackets 56 bolted, as indicated at 58, to the lower surfaces of the gears 52, are provided with vertically disposed pins 59 secured rigidly at their lower ends intermediate the opposite ends of the brackets and projecting through slightly eccentrically disposed openings 61 extending through the gears 52 and the discs 54.

Vertically disposed pins 62 (Figure 5), secured adjacent one end of the brackets 56, pivotally support the ends of a corresponding number of springs 63. The opposite ends of the springs 63 are adapted to be slidably disposed against blocks 64 likewise secured rigidly upon the brackets 56 adjacent the opposite ends thereof. Spools 66, upon which wire 65, suitable for the construction of bead tape, or other similar tension resisting material, is wound, are rotatably mounted on all of the pins 59 projecting from the brackets 56 through the openings 61. The lower flanges of the spools 66 are adapted to deflect the springs 63 out of a rectilinear position between the pins 62 and blocks 64, as a result of which the springs exert a braking action against rotational movement of the spools.

Adjacent the edges of the discs 54 and gears 52 opposite the openings 61, apertures 67 extend radially inwardly from the edges thereof, through which wires 70 from reels 68 are adapted to be disposed. Pins 69, supporting the reels 68, are rotatably mounted in spaced pairs of brackets 71 which are rigidly secured to the frame plate 33 by bolts 72. The series of gears 52, secured to the discs 54, are provided with pairs of gears 51a similar to the gear 51 intermeshing with each adjacent pair of the gears at points more widely spaced than the interruption thereunder caused by the openings 67. Thus the gears 52 and consequently the discs 54 always will be driven positively even when the apertures 67 are directly opposite one of each of the successive pairs of driving gears.

It is apparent that the discs 54 all will be driven in the same direction at a rate three times as fast as the rate of rotation of the shaft 31. The shaft 31 also is provided with a cam 76 secured rigidly to the upper end thereof above the sprocket wheel 43. This cam comprises a pair of arcuate cam surfaces 77 and 78, each including approximately 120° of angular distance relative to the center of the shaft 31, and are separated by a pair of cam surfaces 79 and 81, each including substantially 60° of angular distance relative to such center. The distance between the surface elements of the cam surface 78 and the center of the shaft 31 is substantially greater than the distance between the corresponding elements of the surface 77 and the center of the shaft, while the distance between such center and the surface elements of the cam surfaces 79 and 81 is substantially as much less than the first value as it is greater than the second.

A roller 82, adapted to be engaged successively by the surfaces of the cam 76, is rotatably mounted on a pin 83 having its lower end rigidly secured intermediate the ends of a cam lever 84. A bracket 86, to which one end of the lever 84 is pivotally secured by a pin 87, is rigidly secured to the frame of the machine upon the bearing 41. The bracket 86 also is provided with a vertically disposed portion 88, the upper end of which is secured to one end of a spring 89, while the opposite end of the spring is secured in an intermediate portion of the cam lever 84. The end of the cam lever 84 opposite the pin 87 is slidably disposed in a bracket 91 which is rigidly secured by bolts 92 upon the lower surface of a circumferentially movable ring 93 disposed immediately below the brackets 56 on the lower surface of the gears 52. The opposite edges of the ring 93 are slidably disposed in grooves 95 formed in the adjacent ends of spaced pairs of brackets 94 secured rigidly by bolts 96 to the lower surface of the guide ring 38.

The reels 68 are positioned directly below arcuately formed openings 98 formed in the guide ring 38 between the adjacent pairs of discs 54. When the roller 82 is traversing either of the surfaces 79 or 81, the wires 70 from the reels project through spaced openings 97 formed in the ring 93 and are disposed in the arcuate openings 98. When the roller 82 is traversing either of the cam surfaces 77 or 78, the openings 97 in the ring 93 shift the wires to positions alternately within the apertures 67 of adjacent pairs of the discs 54. All of the wires both from the reels 68 and from the spools 66 are adapted to converge centrally above the machine over a roller 99 supported on a pin 101 between a spaced pair of bars 102 which are secured rigidly above the machine.

A second roller 103, traversed by the wires from the reels and spools, and located directly above the rollers 17 and 22, is rotatably supported on a pin 104, likewise secured adjacent its opposite ends in the lower ends of a rigid pair of bars 106. From the latter roller the wires in the form of a braid 105 extend downwardly between the rollers 17 and 22 and therebeyond around a roller 107 mounted in brackets 108 secured to the floor of the building, while therebeyond it is wound on a reel 109 which engages the surface of the roller 17 in frictionally driven relation. A centrally disposed shaft 111, on which the reel 109 is mounted, is supported adjacent its opposite ends in the upper ends of a spaced pair of arms 112, which are normally inclined toward the roller 17. The lower ends of the arms 112 are pivoted, as indicated at 113, in supporting bearing brackets 114. The wires may be tensioned slightly below the roller 99 by employing a ring 116 or any other suitable mechanical device for applying weight thereto.

When the motor 10 is energized, the rollers 17 and 22 draw the wires 70 and 65 from the reels 68 and the spools 66 to be wound collectively upon the reel 109. During this operation, beginning with the elements in the positions shown by Figure 1, the discs 54 are continuously rotated within the guide ring 38. As soon as the roller 83 moves to the cam surface 79, the ring 93 is shifted in a counter-clockwise direction, thereby shifting the wire 70 from the position indicated at $x$, to the position indicated at $y$, where the wire remains during 180° of rotation of the disc 54, and while the roller 83 traverses the cam surface 79. At this period in the operation of the apparatus the roller 83 moves to the cam surface 78, thereby again shifting the ring 93 in a counter-clockwise direction and likewise shifting the wire 70 from the position indicated at $y$ to the position indicated at $z$. At the time the latter shifting occurs the aperture 67 is in a position 180° from that shown by Figure 1 and accordingly in proper position to receive the wire 70. While the roller entirely traverses the cam surface 78, the disc 54 rotates 360° and as the roller 83 moves to the cam surface 81, the wire 70, together with the like movement of the ring 93, moves in a clockwise direction back from the position indicated at $z$ to the position indicated at $y$, where it remains while the disc rotates 180° and the roller 83 traverses the surface 81. Likewise, as soon as the roller 83 moves from the cam surface 81 back to the cam surface 77, the wire 70, together with the ring 93, is shifted in a clockwise direction, the wire moving from the position indicated at $y$ to the position indicated at $x$.

When the wires 70 from the spools 68 remain in the apertures 67 during 360° rotative movement of the discs 54, they are plaited or braided about the wires 65 that are being unwound from the spools 66, and hence by moving the wires 70 into and out of apertures 67 of adjacent discs, they are plaited about the wires 65 of adjacent spools 66 carried by the discs 54.

When it is desired to construct a fabricated tube, all of the spools and reels of the machine are filled with wire and entrained over the reel 99 and thence to the rollers 17 and 22. However, when it is desired to construct a flat tape, some of the spools and reels are left empty, depending on the number of wires desired to be employed in the tape and the machine is operating as before. It is apparent that several flat tapes may be constructed simultaneously by simply providing an unfilled spool or reel at intervals throughout the machine.

Any desired variation in the number of times that the adjacent wires are plaited about each other may be made by varying the rate of rotation of the rollers 17 and 22 relative to the speed of operation of the braiding mechanism. Likewise, it is apparent that a great many variations in the braid pattern of the article of manufacture produced by this machine may be provided for by varying the surfaces of the cam 76, changing the rate of rotation of the cams relative to each other or by changing the direction of rotation of the discs 54.

In the embodiment of the invention illustrated by Figures 3 and 4, the apparatus is essentially the same as that illustrated by Figures 1 and 2, except for such differences as will be described in the succeeding paragraphs. Those portions of the apparatus which have already been described will be designated by numerals corresponding to those employed in describing the construction disclosed by Figures 1 and 2.

A pair of cams 118 and 119, secured to the upper end of the shaft 31, are provided with relatively extensive surfaces 121 and 122, embracing 180°, respectively, and which are disposed at equal distances from the center of the shaft. Likewise, cam surfaces 123 and 124, embracing 180° of the cams 118 and 119, respectively, are disposed at equal distances from the center of the shaft 31, but at less distance than the surfaces 121 and 122 from such center. Corresponding portions of the respective cams 118 and 119 are disposed 90° apart with respect to the center of the shaft 31.

Separate cam levers 125 and 126 are provided with rollers 127 and 128 secured thereto, that engage the cams 118 and 119, respectively. The inner ends of the levers are pivotally secured, as indicated at 129 and 130, respectively, to a bracket 131 that is rigidly supported upon the member 41. In order that the rollers of the levers 125 and 126 may be constantly urged against the respective cams, a tension spring 132 is provided, which is connected to intermediate portions of the levers and draws them toward each other. The outer ends of the levers 125 and 126 are slidably disposed within brackets 133 and 134, respectively, that are secured to a pair of concentrically disposed rings 136 and 137, respectively. Brackets 138 and 139 secured to the guide ring 38 are provided with grooves 142 and 143, in which the rings 136 and 137 are slidably and circumferentially movable. Openings 144 and 145, formed through the rings 136 and 137, respectively, are disposed intermediate the opposite limits of travel of the rings in positions above the reels 68 in alternate relation. The relation of the sprocket wheels 46 and 43 is such that the shafts 47 and 31 rotate in the ratio of two to one, respectively.

Two pairs of intermeshing gears 146 are provided between each adjacent pair of gears 52, instead of one pair of gears 51, as shown by Figures 1 and 2. Consequently, adjacent discs 54 are rotated in opposite directions at a rate of rotation twice as great as that of the shaft 31. The apertures 67 are formed in the discs 54 on adjacent sides of each succeeding pair of discs in the position shown in Figure 3.

Each time the cam levers 125 and 126 are shifted by the cams 118 and 119, the wires from the stationary spools 68 are shifted entirely across the openings 98 from the aperture 67 in one of the discs to a corresponding aperture 67 in an adjacent disc.

Referring to Figure 3, it will be observed that the apertures in adjacent pairs of discs are open toward each other. During the first 90° of rotation of the shaft 31, the discs 54 will rotate 180°. At the end of that period of continuous operation of the apparatus, the roller 127 will move suddenly from the cam surface 121 to the cam surface 123, thereby causing the ring 136 to be shifted circumferentially in a counter-clockwise direction as viewed in Figure 3. At the same time, the wires 70 that are disposed in the openings 144, are shifted in a counter-clockwise direction from the aperture 67 in one disc to a corresponding aperture in the adjacent disc.

Continuing the rotation of the cams 118 and 119 through an additional angle of 90°, and the discs through 180°, the roller 128 will be shifted outwardly from the surface 124 to the surface 122, thereby shifting the ring 137 in a counter-clockwise direction, and moving the wires 70 that are disposed within the openings 145 from the aperture 67 to corresponding apertures in the adjacent discs. When the shaft 31 has been rotated through 270°, the roller 127 is shifted back to the cam surface 121, thereby shifting the lever 125 in a clockwise direction back to the position illustrated in Figure 3. The adjacent discs at that moment will have been rotated an additional 180° from the position illustrated in Figure 3, while the wires in the openings 144 are shifted in a clockwise direction from an aperture 67 to a corresponding aperture, which is at that time disposed in opposed relation thereto. At the completion of 360° rotation of the shaft 31, the roller 128 again assumes the position shown by Figure 3, thereby shifting the ring 137 in a clockwise direction and moving the wires in the opening 145 to the original position shown.

It will be observed that while the shaft 31, together with the cams 118 and 119, rotates 360°, the discs 54 are rotated two complete revolutions, and that the rings 136 and 137 are shifted successively in counter-clockwise direction and clockwise direction, one actuation of one of the rings occurring during each 90° of rotation of the shaft 31. Also, each wire extending through the openings 144 remains within an aperture 67 during 360° of rotation before it is shifted to an aperture in an adjacent disc. Likewise, this statement is true with respect to the wires extending through the openings 145. During 180° of rotation of the discs 54, two of the wires are at the same time within one of the apertures 67. The spools 66 and reels 68 are mounted and operated in the same manner as those disclosed in Figure 2.

From the foregoing description, it will be apparent that a great variety of types of braided wire may be produced at a very high rate of speed in production by an apparatus which is essentially very simple in its fundamental principles of construction.

Although I have illustrated but the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. A braiding machine comprising a pair of concentrically disposed curvilinear supports, spaced apertures formed in the supports, notched carriers rotatably mounted within the apertures to rotate about axes perpendicular to the planes of the support, means for simultaneously rotating the carriers, means for supporting spools eccentrically mounted upon the carriers, fixed spools mounted adjacent the supports upon the sides opposite the spools upon the carriers and constituting means for supplying strands of flexible material between the supports and means comprising a member apertured to receive the strands extending parallel to the supports and disposed between the fixed spools and the carriers for oscillating the strands of flexible material from the fixed spools from the opening in one carrier to the opening in the adjacent carrier whereby to cause the strands from the fixed spools to be entwined with the strands from the spools upon the carriers to form the braid.

2. A braiding machine comprising two concentrically arranged spaced rings having mating and approximately semi-circularly arranged apertures formed therein, rotatable carriers mounted within the apertures having eccentrically disposed spool carrying means, a notch formed in the side of each carrier, the notch in each carrier being so disposed as to face in the same direction as the notch in the adjacent carrier, means simultaneously to rotate the carriers in the same direction, fixed spools disposed adjacent the sides of the rings opposite the spools upon the carriers, means simultaneously to rotate the carriers in the same direction, and means to oscillate strands of flexible material from the fixed spools from the notch in one carrier to the notch in the adjacent carrier, said means comprising an oscillating ring having apertures formed thereon through which the strands from the fixed spools are passed.

3. A braiding machine comprising a pair of spaced supports, each support having a plurality of arcuate notches formed therein, the notches in one support mating with the corresponding notches in the other support, carriers rotatably mounted within the arcuate notches, said carriers having spools mounted thereon and having notches formed in the edges thereof, the notch in one carrier facing the notch in the adjacent spool, means simultaneously to rotate the carriers, each carrier rotating in opposite direction with respect to the adjacent carrier, fixed spools mounted adjacent the carriers and having strands of flexible material extending through the notches in the carriers, and means for oscillating the strands from the notch in one carrier to the notch in the adjacent carrier, the means being so formed that the strands in adjacent notches are oscillated in opposited directions.

4. A braiding machine comprising a pair of concentrically disposed rings having spaced carrier receiving apertures formed therein, carriers rotatably mounted within the apertures, spools eccentrically mounted upon the carriers, notches formed in the carriers, the notch in one carrier facing the notch in an adjacent carrier, fixed spools mounted adjacent the carriers upon the side opposite the spools, a pair of concentrically disposed rings mounted in coaxial alignment with the first mentioned rings and having wire receiving openings formed therein, means to oscillate the latter rings in opposite directions, and means simultaneously to rotate the carriers, each carrier rotating in an opposite direction with respect to the adjacent carriers.

In witness whereof, I have hereunto signed my name.

Signed at Akron, in the county of Summit and State of Ohio, U. S. A., this 14th day of May, 1929.

GERALD D. MALLORY.